US007095598B2

(12) United States Patent
Scott et al.

(10) Patent No.: US 7,095,598 B2
(45) Date of Patent: Aug. 22, 2006

(54) FAULT DETECTION APPARATUS AND METHOD

(75) Inventors: Gordon Bryon Scott, Hope Valley (GB); Rodney A. Stone, Walton-On-Thames (GB)

(73) Assignee: FRDX Limited, Walton on Thames (GB)

( * ) Notice: Subject to any disclaimer, the term of this patent is extended or adjusted under 35 U.S.C. 154(b) by 0 days.

(21) Appl. No.: 10/533,930

(22) PCT Filed: Sep. 30, 2003

(86) PCT No.: PCT/GB03/04199

§ 371 (c)(1),
(2), (4) Date: Jul. 26, 2005

(87) PCT Pub. No.: WO2004/045036

PCT Pub. Date: May 27, 2004

(65) Prior Publication Data

US 2006/0007619 A1    Jan. 12, 2006

(30) Foreign Application Priority Data

Nov. 13, 2002  (GB) .................................. 0226504.9

(51) Int. Cl.
*H02H 3/18* (2006.01)
*H02H 3/26* (2006.01)
*H02H 3/42* (2006.01)
*H02H 3/00* (2006.01)
*H02H 7/00* (2006.01)
*H02H 9/02* (2006.01)
*H02H 3/08* (2006.01)

(52) U.S. Cl. ........................ 361/85; 361/78; 361/102; 361/93.1

(58) Field of Classification Search ................ 361/81, 361/78, 102, 93.1
See application file for complete search history.

(56) References Cited

U.S. PATENT DOCUMENTS 4,187,523 A    2/1980  Gray
(Continued)

FOREIGN PATENT DOCUMENTS

EP    0 720 268    12/1994
(Continued)

OTHER PUBLICATIONS

The Patent Office (GB) search report for Application No. GB 0226504.9 dated Mar. 28, 2003
(Continued)

*Primary Examiner*—Brian Sircus
*Assistant Examiner*—Dharti H. Patel
(74) *Attorney, Agent, or Firm*—Nixon & Vanderhye P.C.

(57) ABSTRACT

There is provided an apparatus for producing a trip signal to activate a circuit breaker in an alternating current power line, said apparatus comprising: a sensing circuit operable to sense values representing: a phase difference between current and voltage in said power line; and current amplitude in said power line; a comparison circuit operable to compare said sensed values of phase difference and current amplitude with a trip characteristic defining fault conditions and non-fault conditions and to generate a fault indication signal when a fault condition arises; a fault discriminator operable in response to said fault indication signal to generate a fault-identifying signal discriminating between: a first class of fault in which a mean current value after said fault indication increases relative to a mean current value before said fault indication; and a second class of fault in which a mean current value after said fault indication does not increase relative to a mean current value before said fault indication; and a trip signal generator responsive to said fault-identifying signal and operable to generate said trip signal.

9 Claims, 5 Drawing Sheets

U.S. PATENT DOCUMENTS 4,330,778 A    5/1982  Yamazaki et al.
4,672,501 A *  6/1987  Bilac et al. ................... 361/96
6,392,422 B1 * 5/2002  Kammer et al. ............ 324/650

FOREIGN PATENT DOCUMENTS

GB    2 065 394    11/1979
GB    2 260 042    9/1992

OTHER PUBLICATIONS

International Search Report for International Application PCT/GB03/04199 dated Feb. 25, 2004.

M. Yenchek et al, "Distinguishing Motor Starts From Short Circuits Through Phase-Angle Measurements" United States Department of the Interior, Bureau of Mines, Report of Investigations/1997, RI 9638.

* cited by examiner

FAULT DETECTION APPARATUS AND METHOD

This application is the U.S. national phase of international application PCT/GB2003/004199 filed 30 Sep. 2003 which designated the U.S. and claims benefit of GB 0226504.9, filed 13 Nov. 2002, the entire contents of each of which are hereby incorporated by reference.

This invention relates to a fault detection apparatus and method. More particularly the invention relates to an apparatus and method for producing a trip signal to activate a circuit breaker in an alternating current power line.

A short circuit in a power line may produce an arc. This type of fault is sometimes referred to as parallel arcing. The short circuit may be between a live wire and earth or, in three phase alternating current systems, between the power lines carrying the different phases (termed a "phase-to-phase" short circuit). The magnitude of the arc current can be high and presents a fire risk. In hazardous environments, for example, inside a mine where there may be flammable liquids or explosive gases, arcing due to a short circuit is particularly dangerous.

Whenever a switched is opened or closed an arc is produced. This type of arcing is called series arcing and occurs under normal operating conditions. Series arcing can also occur due to a faulty connector.

It is common for power lines to be provided with circuit breakers. If a fault on the power line is detected the circuit breaker acts to prevent electricity being supplied through the power line.

When an appliance, such as a motor, is connected to the power line there will be a start up period in which the full load of the appliance is not being applied to the power line. During the start up period the current passing through the power line will be greater than the current after the start up period when the full load of the appliance is applied. The surge of current during the start up period is termed "current inrush" and the current when the full load is applied is termed the 'full load current' (FLC). Similarly, when the appliance is disconnected from the power line, there will also be a period in which the full load is not being applied and the current level will again arise above the FLC level. If the circuit breaker mistakes normal inrush current and possible series arcing created by contact bounce of the switch gear contacts, then nuisance tripping could occur.

Normal switchgear operation involves the opening and closing of contactors. On opening of a contactor the arc drawn out by the contacts could give rise to a trip signal.

Two commonplace methods are used to prevent nuisance tripping due to switchgear operation.

In a first method, the tripping threshold settings of the circuit breaker is set to a current level which will ignore the transient start and stop characteristics (e.g. inrush current). In effect the fault detection system is desensitised to levels of fault current which are many times the full load current of the appliance connected to the power line. A problem with this method is that the circuit breaker will not respond to a short circuit current which is lower than the set fault current level, this could allow considerable damage to take place.

In a second method, the fault detection is disabled for a period ('delay period') during which inrush currents and series arcing is expected from normal switchgear operation. A problem with this method is that there is no protection available during the long delay period.

In safety critical environments desensitisation or a long delay period, in which a short circuit cannot be detected, is unacceptable. An example of such a safety critical environment is that found down a mine, but other environments may also require circuit breakers where the delay period is reduced or eradicated.

One aspect of the invention provides an apparatus for producing a trip signal to activate a circuit breaker in an alternating current power line, said apparatus comprising: a sensing circuit operable to sense values representing: a phase difference between current and voltage in said power line; and a current amplitude in said power line; a comparison circuit operable to compare said sensed values of phase difference and current amplitude with a trip characteristic defining fault conditions and non-fault conditions and to generate a fault indication signal when a fault condition arises; a fault discriminator operable in response to said fault indication signal to generate a fault identifying signal discriminating between: a first class of fault in which a mean current value after said fault indication increases relative to a mean current value before said fault indication; and a second class of fault in which a mean current value after said fault indication does not increase relative to a mean current value before said fault indication; and a trip signal generator responsive to said fault identifying signal and operable to generate said trip signal.

The invention provides the ability to distinguish between different types of fault indication and take different action according to the type of fault that has been indicated. For example if the fault indication is due to normal switchgear operation then no action may be taken.

In preferred embodiments of the invention said trip signal generator generates a trip signal when said fault identifying signal identifies that said fault indication is due to said first class of fault occurring.

In preferred embodiments of the invention said first class of fault is a short circuit.

A trip signal generator that is able to distinguish a short circuit from other types of fault and respond without delay to the short circuit provides a great enhancement in safety since continuous protection against short circuit faults is provided.

Viewed from another aspect the invention provides a method for producing a trip signal to activate a circuit breaker in an alternating current power line, said method comprising the steps of sensing values representing: a phase difference between current and voltage in said power line; and a current amplitude in said power line; comparing said sensed values of phase difference and current amplitude with a trip characteristic defining fault conditions and non-fault conditions; generating a fault indication signal when a fault condition arises; discriminating, in response to said fault indication signal, between: a first class of fault in which a mean current value after said fault indication increases relative to a mean current value before said fault indication; and a second class of fault in which a mean current value after said fault indication does not increase relative to a mean current value before said fault indication; generating a fault identifying signal in response to said discriminating; and generating a trip signal in response to said fault identifying signal Aspects of the invention may also be provided in the form of a computer program held on a computer program product for controlling a general purpose processor to perform the techniques described above.

Embodiments of the invention will now be described, by way of example only, with reference to the accompanying drawings in which.

Figure 1:
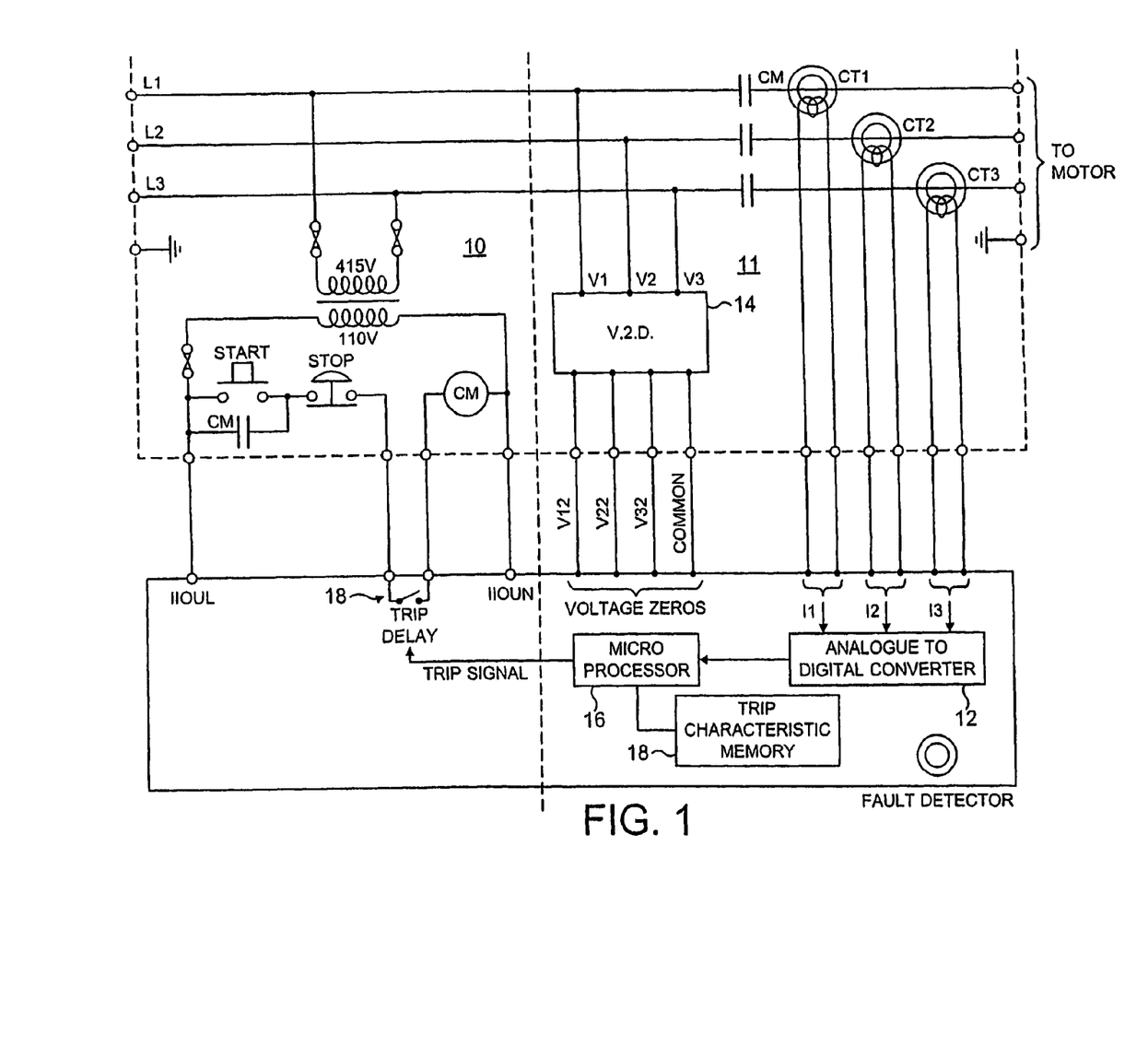
FIG. 1 schematically illustrates an apparatus for detecting a fault condition in an alternating current power supply line.

FIG. 1 illustrates a fault detector 11 and a circuit breaker 10. The fault detector is connected to power lines L1, L2 and L3 which carry respective phases of a three phase alternating current. The fault to be detected is either in an appliance, for example a motor, connected to the power supply line or in the power supply lines themselves. The fault detector is made up of three current transformers CT1, CT2 and CT3, an analogue to digital converter 12, a voltage zero detector 14, a microprocessor 16 and a trip characteristic memory 18.

The current transformers CT1, CT2 and CT3, sense the amplitude of the current passing through respective lines L1, L2 and L3. The output from the current transformers CT1, CT2 and CT3 is provided to the inputs of the analogue to digital converter 12 which provides digital signals to the microprocessor 16 indicative of the amplitude of the currents in the respective lines L1, L2 and L3. The microprocessor 16 acts on the digital signals to calculate the phase of the current in each of the power lines L1, L2 and L3.

The voltage zero detector 14 monitors voltage zero points in each of the lines L1, L2 and L3 and sends a signal V1Z, V2Z and V3Z to the microprocessor 16 whenever a voltage zero is detected in a respective line L1, L2 and L3. The microprocessor 16 acts on the signals V1Z, V2Z and V3Z to calculate the phase of the voltage in each cable L1, L2 and L3. The microprocessor 16 is therefore able to calculate the phase difference between the current and voltage in each of the lines L1, L2, L3.

Figure 2:
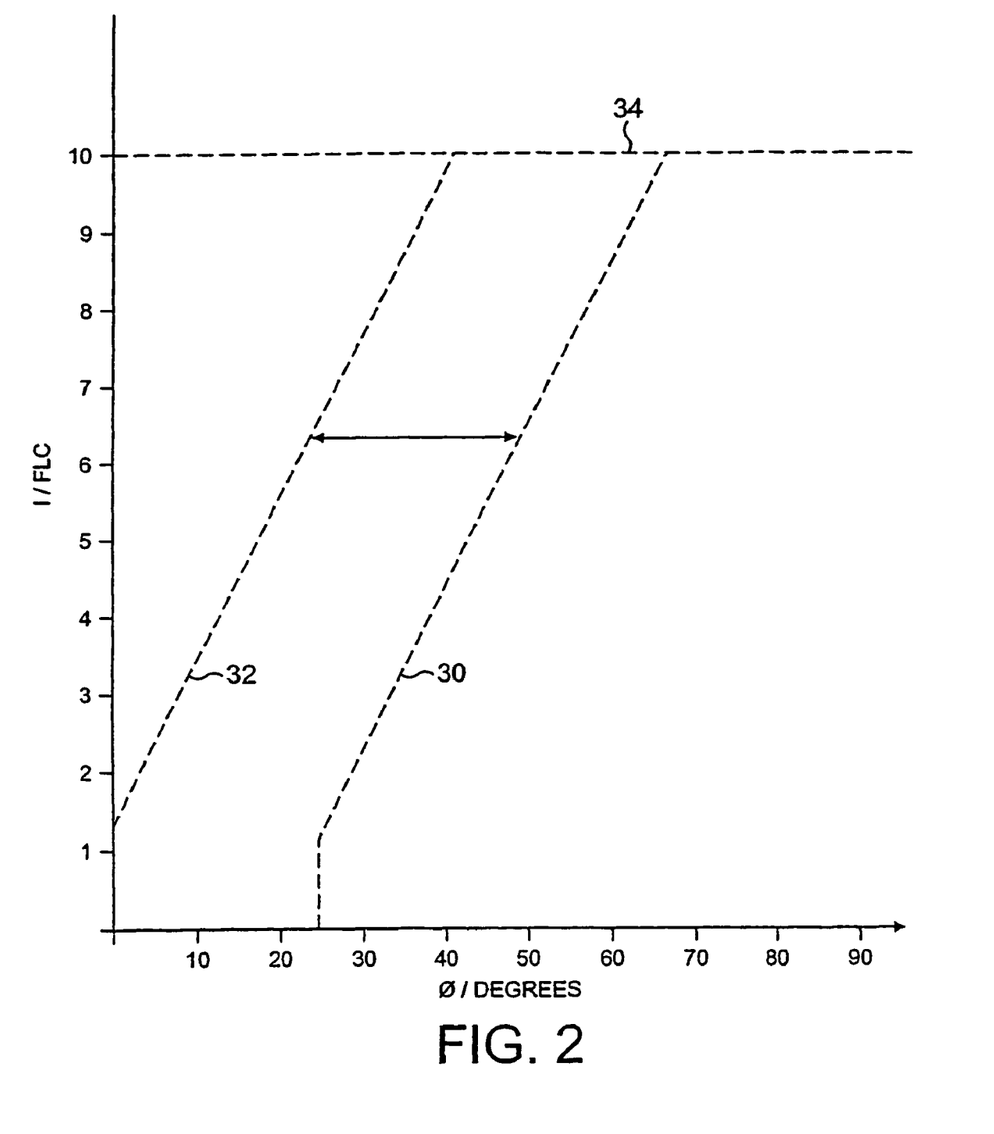
FIG. 2 is a graphical representation of a trip characteristic used by the apparatus of FIG. 1.

A trip characteristic memory 18 stores a trip characteristic used to determine whether the phase difference between the voltage and current in each cable of the lines L1, L2 and L3 together with the current amplitude in that cable corresponds to a fault condition. FIG. 2 illustrates a typical trip characteristic.

Figure 3:
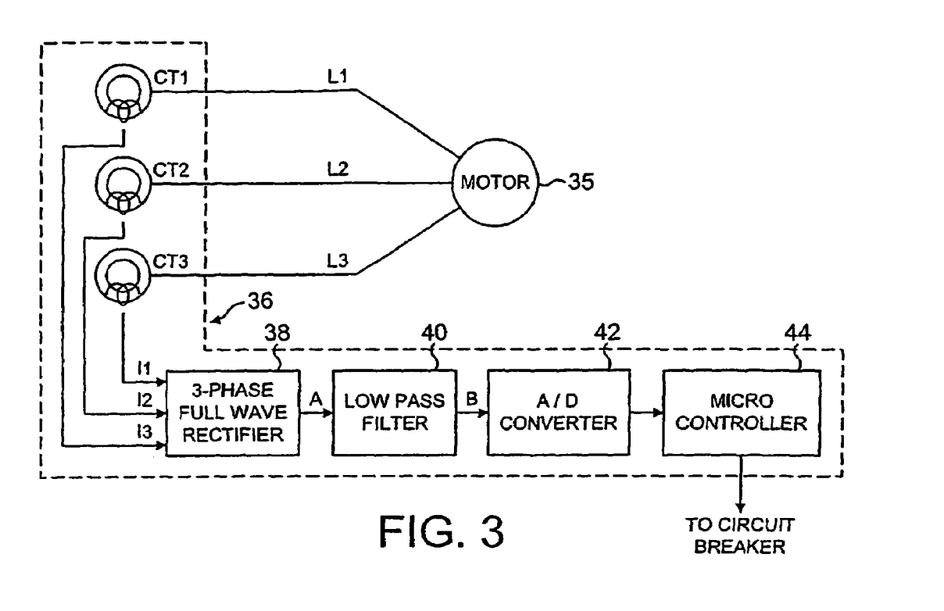
FIG. 3 is a schematic illustration of a first example of an apparatus for producing a trip signal by monitoring the current in three phase alternating current power supply lines.

Full load current is the current being supplied to the appliance when the full load of the appliance is applied across the lines L1, L2 and L3. The trip characteristics illustrated in FIG. 2 are graphs of current in units of full load current (FLC) versus the phase lag between the current and voltage measured in degrees. For each value of current amplitude in a line there is a unique value of phase lag. If a fault occurs the current amplitude increase and the phase lag reduces. If the phase lag is measured continuously and compared to that which should exist (i.e. under non-fault conditions) for the instantaneous value of the current then a fault condition will be indicated by the measured angle being less than the one obtained from a trip characteristic curve. Two curves are illustrated in FIG. 3: a maximum sensitivity curve 30; and a minimum sensitivity curve 32. A user can use a sensitivity control to select a sensitivity curve between the maximum and minimum sensitivity curves. A coordinate defined by a measured value of phase lag (abscissa value) and a measured value of current amplitude (ordinate value) that lies to the 10 eft of the selected curve indicates a fault condition.

For each of the lines L1, L2 and L3 the microprocessor 16 compares the measured phase lag and current amplitude with a trip characteristic accessed from the trip characteristic memory 18 and generates a fault indication signal if a fault condition arises. The microprocessor 16 will also generate a fault indication signal if the amplitude of the current in one of the lines L1, L2 and L3 exceeds a set value. For the characteristics illustrated in FIG. 2 the set value is ten times the full load current (defined by characteristic line 34 in FIG. 2).

The fault indication signal can be used as a trip signal to activate the circuit breaker 10, for example via a trip relay 20.

Conventional trip circuits, that operate only on the amplitude of the current in a cable, require a delay so that the current surges associated with normal motor start-up will not cause a nuisance trip.

The fault detector 11 described above with reference to FIGS. 2 and 3 will not provide a fault indication signal during the normal start up of a motor attached to the lines L1, L2 and L3. This is because the surge of current at motor start up is accompanied by a concomitant rise in phase lag. Therefore, normal motor start up will not cause a trip signal to be sent Series arcing due to normal switchgear operation may produce a temporary increase in measured current amplitude, when the arcing is due to a contactor opening this increase in current amplitude is eventually followed by a decrease of the current amplitude to zero. The increase in current amplitude is accompanied by a reduction in phase lag and will therefore cause a fault indication signal to be generated by the microprocessor 16. To overcome this problem a fault discriminator is provided to discriminate the type of fault that caused the fault detector 11 to produce the fault indication signal.

A fault caused by a short circuit produces a rise in current in one of the lines L1, L2 and L3. A fault due to increased resistance or series arcing on one phase of a three phase alternating circuit causes a loss of current In the case of series arcing the arc is nearly always preceded by the complete loss of current in the line carrying that phase for a portion of the AC cycle (either from normal switch gear operation or due to a faulty connection). Then an arc strikes and the current flow is restored by means of the arc. The loss of current preceding a series arc can be used to discriminate between a series arc and a short circuit: a rise in current following a fault indication discriminates a short circuit; a drop of current following a fault indication discriminates a resistive fault or series arcing.

FIG. 3 is a schematic illustration of a first example of a fault discriminator 36. The fault discriminator 36 is made up of current transformers CT1, CT2 and CT3, a three phase full wave rectifier 38, a low pass filter 40, an analogue to digital converter 42 and a microcontroller 44.

The current transformers CT1, CT2 and CT3, sense the amplitude of the current passing through respective ones of the lines L1, L2 and L3. The current transformers CT1, CT2 and CT3 may be the same current transformers used in the fault indicator 11 illustrated in FIG. 1 or they may be different current transformers. The output from the current transformers CT1, CT2 and CT3 is supplied to the three phase rectifier 38. The three phase rectifier 38 produces a rectified output that is filtered by a low pass filter 40. The resultant filtered signal is converted to a digital signal by the analogue to digital converter 42 and the digital signal is operated on by the microcontroller 44 (or microprocessor).

Figure 4:
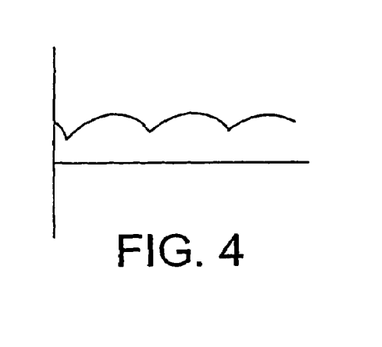
FIG. 4 is a graphical representation of a current waveform in the apparatus of FIG. 3, before low pass filtering, when no fault is present.
Figure 5:
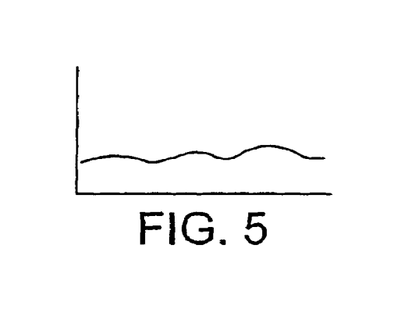
FIG. 5 is a graphical representation of a current waveform in the apparatus of FIG. 3, after low pass filtering, when no fault is present.

FIGS. 4 and 5 illustrate current waveforms present in fault discriminator 36 when a motor 35, or other connected appliance, is functioning normally. FIG. 4 illustrates a current waveform before three phase rectification of the current signals from the current transformers CT1, CT2 and CT3 by the three phase rectifier 38 (waveform at position A marked on FIG. 3). It can be seen that all three phase currents are present. FIG. 5 illustrates a waveform corresponding to that illustrated in FIG. 5 after it has been filtered by the low pass filter 40 (waveform at position B marked on FIG. 3).

Figure 6:
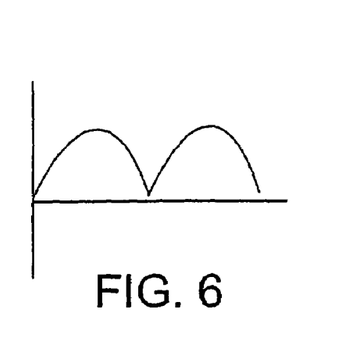
FIG. 6 is a graphical representation of a current waveform in the apparatus of FIG. 3, before low pass filtering, when a fault causes the complete loss of a phase.
Figure 7:
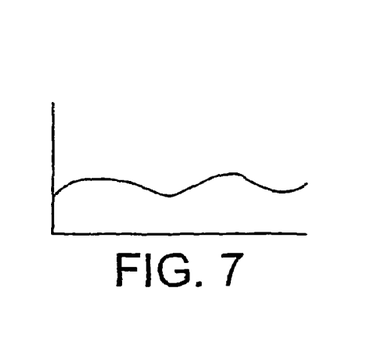
FIG. 7 is a graphical representation of a current waveform in the apparatus of FIG. 3, after low pass filtering, when a fault causes the complete loss of a phase.

FIGS. 6 and 7 illustrate current waveforms at positions A and B respectively when series arcing causes loss of current in one of the phases.

Figure 8:
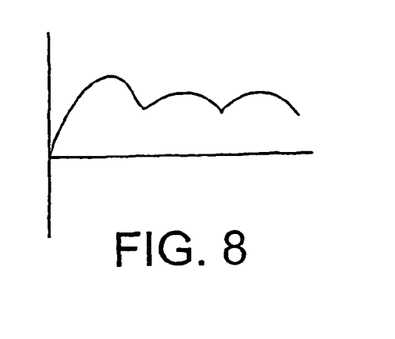
FIG. 8 is a graphical representation of a current waveform in the apparatus of FIG. 3, before low pass filtering, showing a current rise following a loss of phase.
Figure 9:
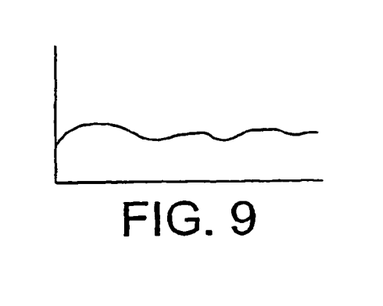
FIG. 9 is a graphical representation of a current waveform in the apparatus of FIG. 3, after low pass filtering, showing a current rise following a loss of phase.

The initial loss of current in a phase is followed by an initial rise in measured current amplitude above normal levels. This behaviour is illustrated in FIG. 8. This increase in measured current is due to the three phase rectifier 38 rectifying two phases instead of three. The initial rise in current can cause the microcontroller 44 to diagnose a short circuit since the measured current has risen. To overcome this problem the time constant of the low pass filter 40 is chosen to reduce the measured increase in current. Effectively the low pass filter 40 acts to average out the initial loss of current, caused by the loss of current in a phase, with the subsequent increase of current caused by the rectifier 38. This is illustrated in FIG. 9 which shows the waveform in FIG. 8 after it has been filtered by the low pass filter 40. In this way it is possible to distinguish between series arcing faults and short circuits.

Figure 10:
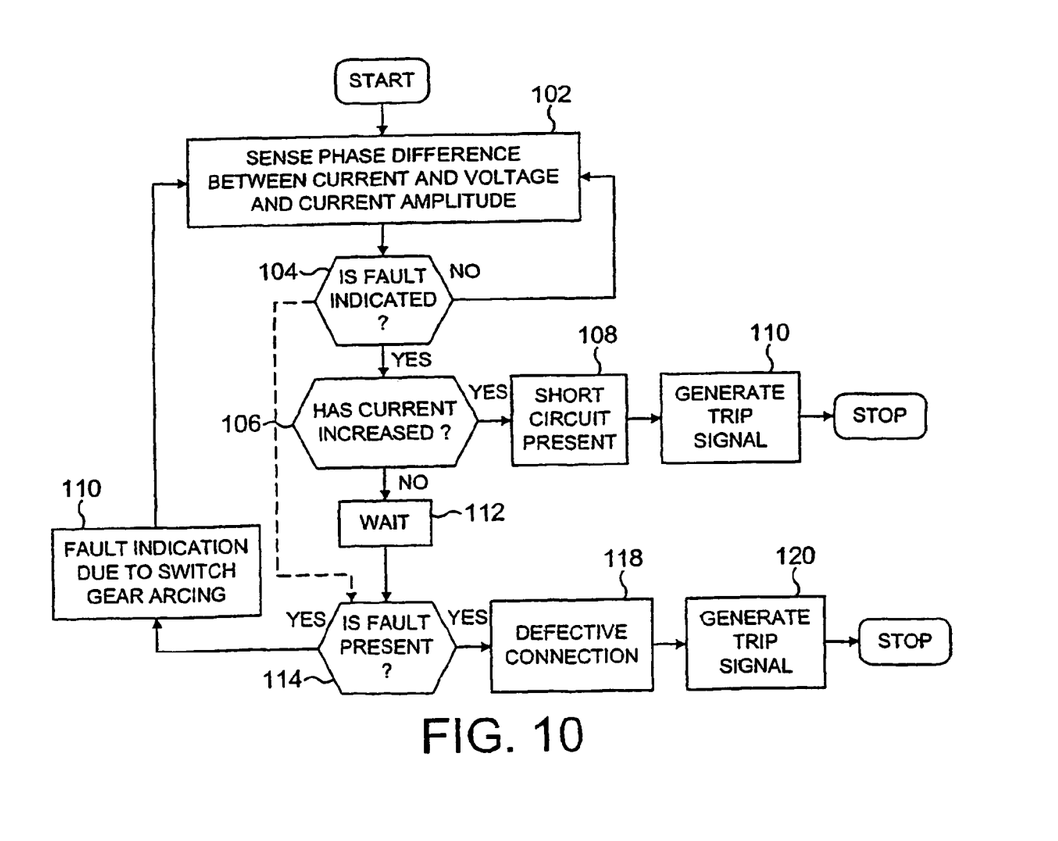
FIG. 10 is a flow diagram showing the operation of the apparatus of FIG. 3.

The operation of the fault discriminator 36 in relation to the fault detector 11 and the circuit breaker 10 will now be described in relation to the flow diagram illustrated in FIG. 10.

In step 102 ("sensing step") the fault detector 11 senses the current amplitude and the phase difference between the current and voltage in each of the lines L1, L2 and L3. In step 104 ("comparison step") the fault detector 11 compares the sensed values with a trip characteristic held in the trip characteristic memory 18 to indicate whether or not a fault is present If the comparison step 104 does not indicate a fault then fault detector continues to perform the sensing 102 and comparison steps 104. If the comparison step 104 does indicate a fault then the fault detector sends a fat indication signal to the fault discriminator 36.

In step 106 the fault discriminator 36 determines whether the mean value of the current in one of the lines L1, L2 and L3 has increased following the fault indication.

In step 108 in response to an increase in the mean current being determined in step 106 a short circuit indication signal is generated. In step 110 a trip signal is immediately generated in response to the short circuit indication signal. The trip signal is sent to the trip relay 20 in the circuit breaker 10 to cause the circuit breaker to stop power being supplied down the lines L1, L2 and L3.

In response to an increase in the mean current not being determined in step 106 a series arcing fault indication signal is generated Series arcing has the effect of producing no change or a reduction in the mean current value following a fault indication. It is not desired to generate a trip signal in response to series arcing in the case when the series arcing is due to a contactor opening or closing in the cause of normal switchgear operation. Therefore, in step 112, in response to the series arcing fault indication the fault discriminator 36 waits for a predefined delay period to allow the effect of switchgear arcing to subside. The predefined delay period can be a set time period. An example time period is 200 milliseconds but other time periods may be chosen according to the particular transient effect of the switchgear on the AC waveform travelling through the lines L1, L2 and L3. Alternatively the predefined period can be defined by a set number of cycles of the AC waveform. The number of cycles may be conveniently counted using the signal from the voltage zero detector 14.

In step 114, following the delay period, the fault discriminator 36 determines if a fault condition is still being indicated. In a first example of step 114, the fault discriminator 36 checks if the fault detector 11 is sending a fault indication signal, that is, the fault detector is continuously performing steps 102 and 104;

Series arcing due to a contactor opening will be eventually followed by the current in the power line diminishing to zero. In a second example of step 114, if the current has not diminished to zero following the delay period, the fault discriminator 36 determines that a fault condition exists.

If a fault condition signal is determined at step 114 then in step 118 a defective connection fault signal is generated. In step 120 a trip signal is generated in response to the defective connection fault signal The trip signal is sent to the trip relay 20 in the circuit breaker 10 to cause the circuit breaker 10 to stop power being supplied down the lines L1, L2 and L3.

If a fault condition signal is not determined at step 114 then in step 116 the fault discriminator 36 determines that the fault indication signal produced by the fault detector 11, was due to normal switchgear arcing. In this situation the fault discriminator does not generate a trip signal.

Figure 11:
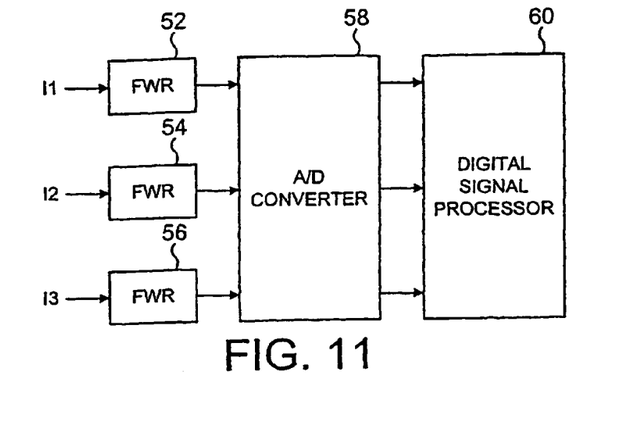
FIG. 11 is a schematic illustration of a second example of an apparatus for producing a trip signal by monitoring the current in a rectified signal for each phase of a three phase alternating current power supply.

FIG. 11 is a schematic illustration of a second example of the fault discriminator 50 that can be used in place of the first example of the fault discriminator 36. The fault discriminator 50 is made up of current transformers CT1, CT2 and CT3, three individual full wave rectifiers 52, 54, and 56, an analogue to digital converter 58 and a digital signal processor (DSP) 60.

The current transformers CT1, CT2 and CT3, sense the amplitude of the current passing through respective lines L1, L2 and L3. The current transformers may be the same current transforms used in the fault indicator illustrated in FIG. 1 or they may be different current transformers. The outputs from the current transformers CT1, CT2 and CT3 are supplied to the respective inputs of the three individual full wave rectifiers 52, 54, and 56. Each of the three individual full wave rectifiers 52, 54, and 56 produces a rectified output which is supplied to the analogue to digital converter 58. The analogue to digital converter 60 produces three respective digital signals which are supplied to the inputs of the DSP 60.

The effect of a short circuit involving one of the lines L1, L2 and L3, or an appliance connected to the lines, is an increase in current level as measured by one or more of the current transformers CT1, CT2 and CT3. This can be detected by the digital signal processor 60 as an increase in the digital signal corresponding to the full wave rectified current from the current transformers CT1, CT2 and CT3.

The effect of series arcing is to produce a loss of current in a phase, i.e. the current in one of the lines L1, L2 and L3 dropping to zero. Since the currents from the current transformers CT1, CT2 and CT3 are rectified separately by respective ones of the three individual full wave rectifiers 52, 54, and 56 then the DSP (60) does not detect a rise in the rectified current levels following the loss of current in a phase.

Figure 12:
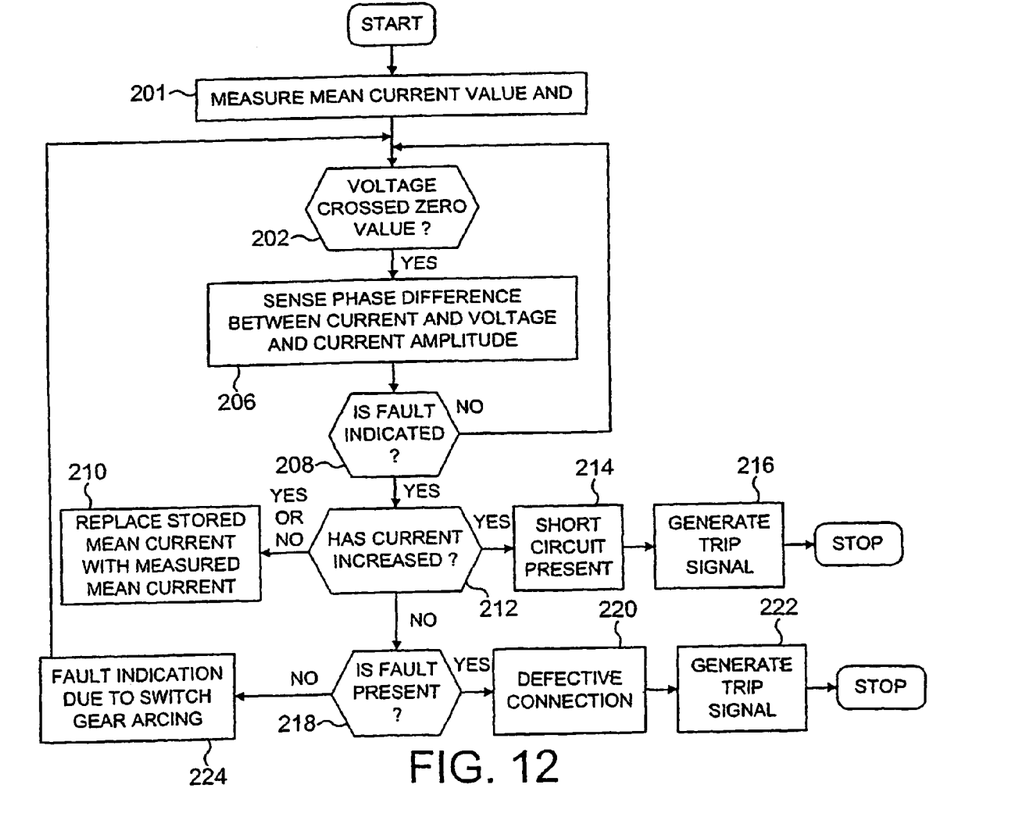
FIG. 12 is a flow diagram showing the operation of the apparatus of FIG. 11.

The operation of the fault discriminator 50 in relation with the fault detector 11 and the circuit breaker 10 will now be described in relation to the flow diagram illustrated in FIG. 12.

In step 201 a mean value of current is measured and stored in a memory.

In step 202 the fault detector 11 detects the beginning of an AC cycle in each of the lines L1, L2 and L3 from respective voltage zero signals generated by the voltage zero detector 14. The voltage zero signals act as reference points used to synchronise the operation of the fault detector 11 and fault discriminator 50.

In step 206 ("sensing step") the fault detector 11 senses the current amplitude and the phase difference between the current and voltage in each cable L1, L2 and L3. In step 208 ("comparison step") the fault detector 11 compares the sensed values with a trip characteristic held in the trip characteristic memory 18 to indicate whether or not a fault is present If the comparison step 208 does not indicate a fault then the fault detector 11 continues to perform the sensing 206 and comparison steps 208. If the comparison step 208 indicates a fault then the fault detector 11 sends a fault indication signal to the fault discriminator 50.

In step 212 the fault discriminator 50, in response to the fault indication signal, determines whether the mean value of the current in one of the lines L1, L2 and L3 has increased, following the fault indication, from the value of the mean current measured and stored in memory at step 201. Once this determination has been made by the fault discriminator 50, in step 210, the determined mean value of current is stored in the memory so that the it can be used in step 212 for the next cycle through the flow diagram.

In step 214 in response to an increase in the mean current being determined in step 212 a short circuit indication signal is generated. In step 216 a trip signal is immediately generated in response to the short circuit indication signal. The trip signal is sent to the trip relay 20 in the circuit breaker 10 to cause the circuit breaker 10 to stop power being supplied down the lines L1, L2 and L3.

In response to an increase in the mean current not being determined in step 212 a series arcing fault indication signal is generated.

In step 218, in response to the series arcing fault indication signal, the fault discriminator 50 determines the nature of the condition that caused the fault indicator 11 to produce a fault indication signal. To do this the fault discriminator 50 determines whether or not the current amplitude, in the phase in which current was lost, has returned to normal levels, i.e. the current level that would be present if no fault was present This determination can be done within one AC cycle.

If the current has returned to normal levels then in step 224 the fault discriminator 50 determines that the fault indication signal, produced by the fault detector 11, was due to normal switchgear arcing. In this situation the fault discriminator does not generate a trip signal and the processing begins again at step 202 on the next voltage zero signal.

If the current has not returned to normal levels then in step 220 the fault discriminator 50 determines that the fault indication signal was due to a defective connection and a defective connection fault signal is generated. In step 222 a trip signal is immediately generated in response to the defective connection fault signal. The trip signal is sent to the trip relay 20 in the circuit breaker 10 to cause the circuit breaker to stop power being supplied down the lines L1, L2 and L3.

It is not necessary for the fault discriminator to wait for a long delay period in which normal switchgear arcing transients will subside since the fault discriminator 50 can discriminate between series arcing due to normal switchgear operation and series arcing due to a faulty connector. However, in practice it may be necessary to wait for all the contactors of the switchgear to open and cease arcing. This wait need only be of the order of 50 milliseconds.

The invention being thus described, it will be obvious that the same may be varied in many ways. Such various are not to be regarded as a departure from the scope of the invention, and all such modification as would be obvious to one skilled in the art are intended to be included within the scope of the following claims.

For example, the skilled person will note that any device capable of detecting current, for example a magnetic sensors such as a Hall sensor, may be used in place of the current transformers CT1, CT2 and CT3.

The invention claimed is:

1. An apparatus for producing a trip signal to activate a circuit breaker in an alternating current power line, said apparatus comprising:
    a sensing circuit operable to sense values representing:
        a phase difference between current and voltage in said power line; and
        a current amplitude in said power line;
    a comparison circuit operable to compare said sensed values of phase difference and current amplitude with a trip characteristic defining fault conditions and non-fault conditions and to generate a fault indication signal when a fault condition arises;
    a fault discriminator operable in response to said fault indication signal to generate a fault identifying signal discriminating between;
    a first class of fault in which a mean current value after said fault indication increases relative to a mean current value before said fault indication; and
    a second class of fault in which a mean current value after said fault indication does not increase relative to a mean current value before said fault indication; and
    a trip signal generator responsive to said fault identifying signal and operable to generate said trip signal;
    wherein, when said fault identifying signal identifies that said fault condition is due to said second class of fault occurring, said fault discriminator generates a state indication signal discriminating between a second class of fault caused by:
        a first state in which there is loss of current for a period following said fault indication followed by restoration of current to a level corresponding to the current level before said fault indication; and a second state in which there is loss of current for a period following said fault indication followed by a current at a level lower than the current level before said fault indication;

said trip signal generator generates a trip signal when said state indication signal identifies that said fault indication is due to said second state occurring; and said second condition is an increase in the resistance of a circuit comprising said power line.

2. The apparatus according to claim 1, wherein said alternating current power line carries a three phase alternating current power supply.

3. The apparatus according to claim 1, wherein said trip signal generator generates a trip signal when said fault identifying signal identifies that said fault indication is due to said first class of fault occurring.

4. The apparatus according to claim 1, wherein said first class of fault is a short circuit.

5. The apparatus according to claim 2, wherein said short circuit is a phase-to-phase short circuit.

6. The apparatus according to claim 1, wherein, when said fault identifying signal identifies that said fault condition is due to said second class of fault occurring, said trip signal generator generates a trip signal if said fault discriminator determines that said fault condition has persisted for longer than a predetermined time.

7. The apparatus according to claim 1, wherein said first state is due to switchgear series arcing.

8. The apparatus according to claim 1, wherein said second condition is series arcing due to a defective connection.

9. A method for producing a trip signal to activate a circuit breaker in an alternating current power line, said method comprising the steps of:

sensing values representing:
  a phase difference between current and voltage in said power line; and
  a current amplitude in said power line;

comparing said sensed values of phase difference and current amplitude with a trip characteristic defining fault conditions and non-fault conditions;

generating a fault indication signal when a fault condition arises;

discriminating, in response to said fault indication signal, between;

a first class of fault in which a mean current value after said fault indication increases relative to a mean current value before said fault indication; and a second class of fault in which a mean current value after said fault indication does not increase relative to a mean current value before said fault indication;

generating a fault identifying signal in response to said discriminating; and generating a trip signal in response to said fault identifying signal; wherein, when said fault identifying signal identifies that said fault condition is due to said second class of fault occurring, generating a state indication signal discriminating between a second class of fault caused by;

a first state in which there is loss of current for a period following said fault indication followed by restoration of current to a level corresponding to the current level before said fault indication; and a second state in which there is loss of current for a period following said fault indication followed by a current at a level lower than the current level before said fault indication;

generating a trip signal when said state indication signal identifies that said fault indication is due to said second state occurring; and said second condition is an increase in the resistance of a circuit comprising said power line.

* * * * *